United States Patent [19]

Sekiyama et al.

[11] Patent Number: 4,897,998
[45] Date of Patent: Feb. 6, 1990

[54] TURBO COMPOUND ENGINE

[75] Inventors: Shigeo Sekiyama; Shigeru Nihongi; Sadatoshi Mogami, all of Kawasaki, Japan

[73] Assignee: Isuzu Motors Limited, Tokyo, Japan

[21] Appl. No.: 264,298

[22] Filed: Oct. 28, 1988

[30] Foreign Application Priority Data

Oct. 28, 1987 [JP] Japan .................. 62-270327
Oct. 28, 1987 [JP] Japan .................. 62-270328

[51] Int. Cl.⁴ .................................. F02G 5/00
[52] U.S. Cl. .......................... 60/614; 60/624
[58] Field of Search ................. 60/611, 614, 624

[56] References Cited

U.S. PATENT DOCUMENTS 2,375,852  5/1945  Kilchenmann .......... 60/624 X
4,748,812  6/1988  Okada et al. ............ 60/624 X
4,800,726  1/1989  Okada et al. ............ 60/624 X

FOREIGN PATENT DOCUMENTS 61-921    3/1986  Japan ........................... 60/624
286531   12/1986  Japan ........................... 60/624

Primary Examiner—Michael Koczo
Attorney, Agent, or Firm—Dykema Gossett

[57] ABSTRACT

A turbo compound engine is provided with a rotor which is connected to the engine's output shaft so as to deliver working medium, such as intake air or exhaust gas or a mixture of the two, and a bypass line that bypasses the rotor, so that it not only utilizes the compression work and delivery work the rotor performs for a part of the braking force in the event of engine braking, but also attains a rapid and smooth increase in engine power output by allowing the working medium to bypass the rotor for a while when the engine operation mode is shifted from rotor-assisted engine brake mode to rotor-assisted engine drive mode for acceleration.

22 Claims, 12 Drawing Sheets

*Turbine assisted engine braking

FIG.2

Control during shiftover from turbine braking*1 to turbine driving*2

C: valve closed; O: valve opened

| Engine Operation Mode | Domain | Valve Control | | | |
|---|---|---|---|---|---|
| | | Shut off valve | Exhaust brake v. | Check valve | Bypass valve |
| Turbine drive*1 | D | C | O | O | C |
| Exhaust bypass | E | C | O | O⇔C | C |
| Turbine brake*2 | F | O | O or C | C | O |

*1 Engine driving boosted up by turbine.

*2 Engine braking assisted by turbine working as compressor.

FIG.3

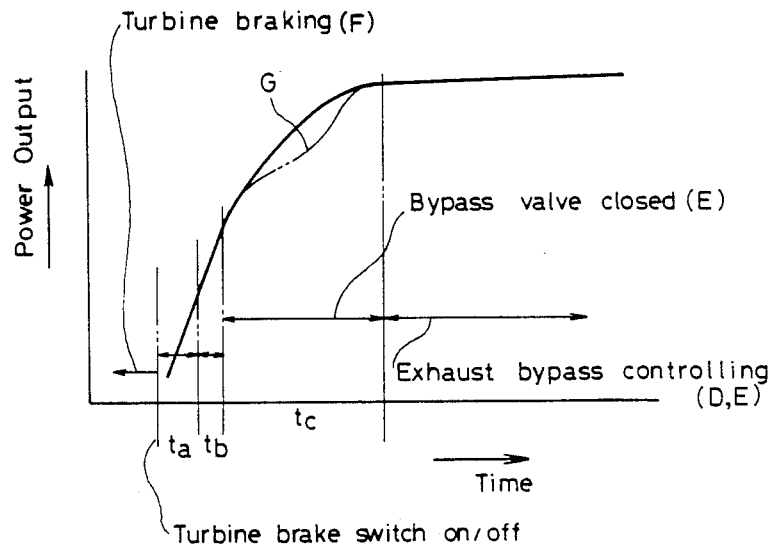

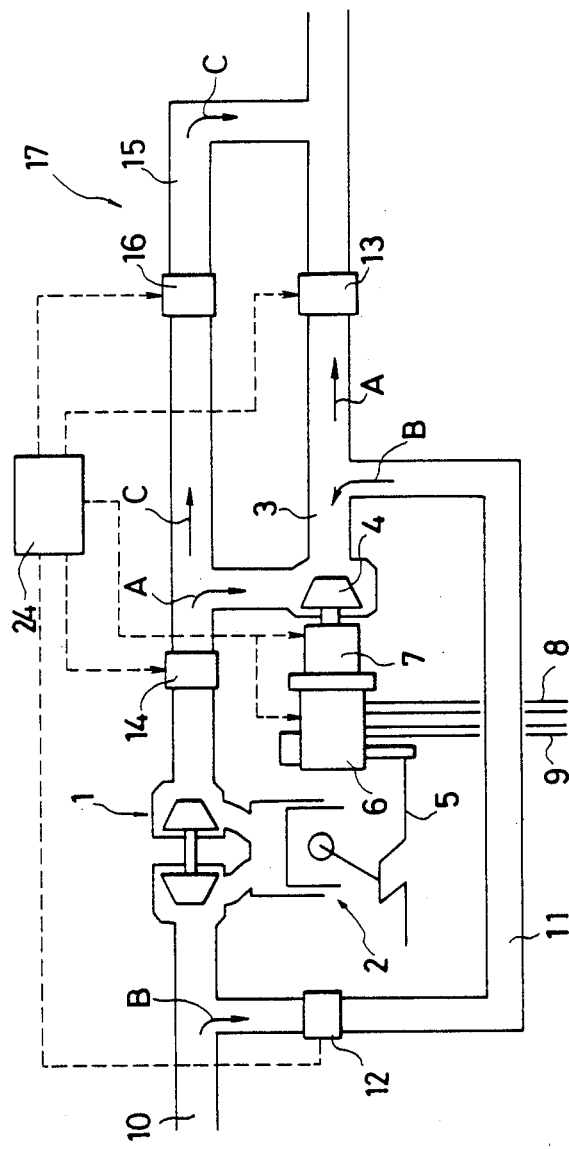

*Turbine-assisted engine braking

FIG.9

Control during shifover from turbine braking*¹ to turbine driving*²

C: valve closed; O: valve opened

| Engine Operation Mode | Domain | Valve Control | | | |
|---|---|---|---|---|---|
| | | Shut off valve | Exhaust brake v. | Check valve | Bypass valve |
| Turbine drive*¹ | D | C | O | O | C |
| Exhaust bypass | E | C | O | O⇔C | C |
| Turbine brake*² | F | O | O or C | C | O |

*¹Engine driving boosted up by turbine.

*²Engine braking assisted by turbine working as compressor.

FIG.11

Control during shiftover from turbine braking*1 to turbine driving*2

C: valve closed; O: valve opened

| Engine Operation Mode | Domain | Valve Control | | | |
|---|---|---|---|---|---|
| | | Shut off valve | Exhaust brake v. | Check valve | Bypass valve |
| Turbine drive*1 | D | C | O | O | C |
| Exhaust bypass | E | C | O | O↔C | C |
| Turbine brake*2 | F | O | O or C | C | O |

*1 Engine driving boosted up by turbine.

*2 Engine braking assisted by turbine working as compressor.

FIG.12

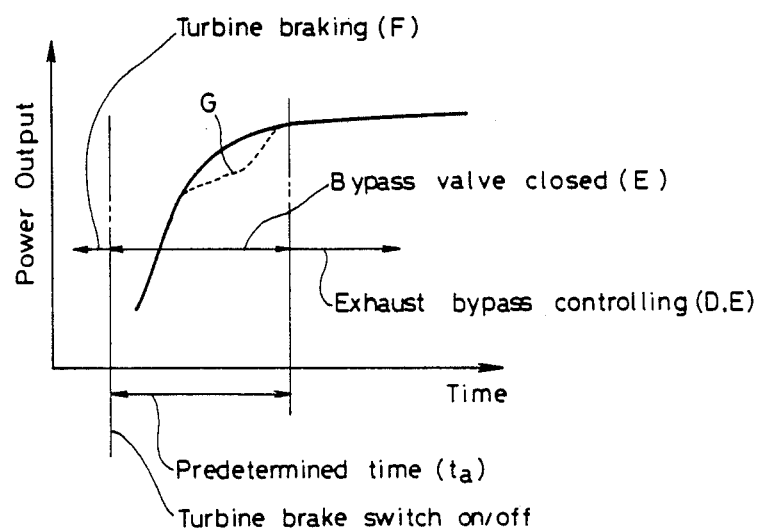

TURBO COMPOUND ENGINE

BACKGROUND OF THE INVENTION

1. Techninal Field

The present invention relates to a turbo compound engine that is equipped with a power turbine and an exhaust bypass mechanism; wherein the power turbine is so designed as to be able, under the control of the exhaust bypass mechanism, to assist the engine in an engine driving mode of operation by recovering the exhaust gas energy as the power turbine is rotating in a normal direction (called "turbine drive" hereinafter) while exerting on the engine a braking force by pumping work the power turbine performs as the power turbine is driven by the engine in the reverse direction as a compressor ("turbine brake"), where the medium that the turbine deals with is exhaust gas or intake air or a mixture of the two; and the exhaust bypass mechanism, which is composed of a bypass line that lets the exhaust gas bypass the turbine and a bypass valve that controls the opening of the bypass line, is so designed as to determine whether the turbine's operation mode is turbine drive or turbine brake.

2. Background Art

In turbo compound engine systems, it is usual, as shown in FIG. 4, to obtain an additional power output in the engine 2 that is equipped with a turbocharger 1 by recovering the exhaust gas energy, first with the turbocharger 1 by supercharging the intake air into the engine 2, then with a power turbine 4, which is provided in the exhaust path 3 downstream of the turbocharger 1, by generating rotation power and applying it to the crank shaft 5 of the engine 2.

Here, it is to be noted that an engine system as described above, namely, one whose engine 2 is boosted up with the roation power generated by turbine 4 in addition to the intake air supercharging by turbocharger 1, demands a considerable braking force.

For this requirement, an engine system has been developed that is capable of performing an additional engine braking besides performing normal foot-brake braking and exhaust gas braking, which additional braking force is generated by driving an exhaust gas energy recovery turbine 4 from the engine 2 side, not in its normal direction of rotation but in the reverse direction, so that the turbine 4 will perform pumping action as a compressor. An example is shown in FIG. 4, where a reverser 6 to perform rotation reversing of the turbine 4 and a coupling mechanism 7, which consist of reduction gears and a fluid coupling to absorb the rotary inertia (i.e., slipping) as well as adjust the revolution speed of turbine 4 when it is reversed, are provided between the turbine 4 and the crank shaft 5 so as to perform transmission of the driving power in both directions.

In the figure, numeral 8 refers to a hydraulic system to control the reverser 6, and numeral 9 to another hydraulic system to cool the reverser 6 from heat generated upon slipping and other causes during reversing movement.

To this engine system, there is also provided an intake air bypass 11 for letting the turbine 4 utilize the intake air while it is performing pumping work as a compressor as driven by the engine 2 in the turbine brake mode of operation, in addition to the exhaust bypass 3 that feeds the exhaust gas to the turbine 4 (in the direction of arrow A) when operated in the turbine drive mode. The intake air bypass 11 is laid out so as to lead the intake air from the intake path 10 to the delivery side of the turbine 4 (in the direction of arrow B), and it is controlled by a shut-off valve 12 so that the intake air will be fed to the turbine 4 only when it is in the turbine brake mode of operation (i.e., when the rotation of the turbine is reversed).

In the exhaust bypass 3, on the other hand, there is provided a check valve 13 to close up the exhaust bypass 3 while the turbine 4 is reversed, so as to block the back-flow of exhaust gas. Between the turbocharger 1 and the turbine 4, moreover, there is provided an exhaust brake valve 14 that closes up the exhaust bypass 3 when the exhaust gas braking is applied.

Furthermore, this system is equipped with an exhaust bypass mechanism 17, which is composed of a bypass line 15 that bypasses the exhaust gas from turbine 4 (in the direction of arrow C) and a bypass valve 16 that controls the opening of the bypass line 15. Here, the exhaust bypass mechanism 17 works to allow the exhaust gas to bypass the turbine 4 whenever the load on the engine 2 is so low that feeding of the exhaust to turbine 4 may result in unnecessary rise of the back pressure within the exhaust bypass 3, and as a consequence in bringing about undesired power loss in the turbocharger 1 and in the engine 2.

The functions of the bypass valve 16 are as follows: when the engine load, as indicated by a signal the engine 2 gives out, for example, by the position of the control rack of a governor (this will be called simply "rack" hereinafter), is within the predetermined load range and, at the same time, the engine revolution speed is within the predetermined revolution speed range (the domain in which the engine is driven by the turbine, D (called "turbine" drive domain D" hereinafter)), the bypass valve 16 is closed to stop the bypassing of exhaust gas as shown in FIG. 5, while feeding the turbine 4 with exhaust gas to allow the turbine 4 to drive the engine 2; whereas when the engine load situation is outside domain D (the domain in which the exhaust gas is bypassed, E ("exhaust bypass domain E")), the bypass valve 16 is opened to allow the exhaust gas to bypass the turbine 4.

These relations are illustrated in FIG. 6. Namely, in the domains D and E of normal operation of the engine 2 (i.e., everywhere excepting the domain of turbine-assisted engine brake mode of operation F (the "turbine brake domain F"), the exhaust bypassing is activated or deactivated in accordance with whether the operation is within the range defined by the predetermined engine revolutions and predetermined engine loads or without it (in the turbine drive domain D or in the exhaust bypass domain E).

Referring now to FIG. 7, in an engine system as described above, signals coming from the key switch 31, an accelerator switch 18, and a clutch switch 19, the exhaust brake switch 20, the turbine brake switch 21, the rack sensor 22, and the engine revolution sensor 23 are input to a CPU 28 of the control unit 24 through the signal input circuit 25, an A/D converter 26, and a waveform shaping circuit 27. Then the signals are processed in the CPU 28 with reference to the control conditions stored in ROM 29, such as the operation map illustrated in FIG. 6, so that the control signals are sent out to the reverser 6 and valves 12 to 14 and 16 from the output circuit 30. Here, it is to be noted that beside the operation described above, i.e., storing of entire references in a ROM, other operations, for example, with use of RAM for instantaneous and progressive data precessing are equally satisfactory.

In the aforedescribed exhaust bypass control, in particular, the rack sensor 22, the engine revolution sensor 23, and the turbine brake switch 21 participate cooperatively in a manner such that when the turbine brake switch 21 is turned on, the operation is shifted from the two domains of normal engine operation mode, D and E (the "normal engine operation domain D, E") to the turbine brake domain F (shifting in the opposite direction being executed when the turbine brake switch 21 is turned off), while the changeover between the two domains of normal engine drive operation mode D and E is conducted with reference to the values of signals coming from the rack sensor 22 and the engine revolution sensor 23.

Now, the control of valves 12 to 14 and 16, particularly that of the bypass valve 16 of the exhaust bypass mechanism 17, is conducted in a flow chart described below (see FIGS. 8 and 9):

After initializing the control unit 24 with initial data, the control unit 24 reads in the signals that have been mentioned in the foregoing paragraphs and processes them. Namely, in the normal operation range, firstly the exhaust bypass control is executed on the basis of engine load and engine revolution speed once engagement of the clutch is confirmed by the clutch switch 19.

In this case, the shut-off valve 12 is always closed and the exhaust brake valve 14 is always opened, so that when the turbine 4 is in the normal turbine drive mode (domain D), the exhaust path 3 is opened (the check valve 13 is open) while the bypass line 15 is closed (the bypass valve 16 is closed) to feed the exhaust to the turbine 4. When the operation is in the exhaust bypass domain E, on the other hand, it is preferable to close the exhaust path 3, even though it may be left open (the check valve 13 is either closed or open), while opening the bypass line 15 (the bypass valve 16 is open), so that the exhaust gas will flow bypassing the turbine 4.

Subsequently, as the turbine brake switch 21 is turned on, the turbine 4 is reversed, and the operation is shifted over to the turbine brake domain F. In this case, the control of valves 12 to 14 and 16 is such that the shut-off valve 12 of the intake air bypass 11 and the bypass valve 16 of the bypass line 15 are both opened so as to drive the turbine 4 as a compressor, while the check valve 13 of the exhaust path 3 is closed. The exhaust brake valve 14 is closed/opened as the exhaust brake switch 20 is turned on/off. These states of operation are returned to the normal exhaust bypass mode of controlling described above as the turbine brake switch 21 is turned off.

Here, the prior practice has been such that, when the engine operation is shifted from the turbine brake domain F over to the turbine drive domain D, the control is so set as to let the operation go through the exhaust bypass domain E after exiting the domain F and before entering the domain D, as shown by arrows H in FIG. 6.

Such a control suffers from following problems: for example, when it is desired to accelerate the engine 2 within a relatively short period of time from the state of the turbine brake, the acceleration is recognized first by the rack sensor 22 as an sharp increase in the engine load and by the engine revolution sensor 23 as a sharp increase in the engine revolution, as shown by arrow J in FIG. 6. Here, the difficulty is associated with controlling of the bypass valve 16. That is to say, because of the necessity of going through the exhaust bypass domain E as shown in FIG. 6, the bypass valve 16 is left open, keeping the bypass line 15 opened for a considerable period of time.

Now, it is true that the bypass valve 16 starts closing toward the final stage in the exhaust bypass domain E, raising the pressure of the exhaust path 3 and increasing revolution of the turbine 4 as shown in FIG. 3, but until such a state of affairs has been attained, the pressure within the exhaust path 3 cannot become sufficiently high, even though a large quantity of fuel is being fed into the engine 2 obeying the command of acceleration and raising the pressure of the exhaust gas, because the increase in the pressure of the exhaust path 3 is dissipated through the bypass line 15 (as shown by G in the figure).

This results in "breathing" during the rise in the power turbine revolution speed, making the output increase stepwise rather than smooth, and degrading the response characteristics.

To summarize, the central problem in this way of controlling has been as follows:

as the engine operation mode is shifted from turbine brake mode to normal mode, the bypass valve 16 has to be kept open in the exhaust bypass domain E, so that smooth increase of the turbine revolution in accordance with the exhaust gas temperature and the rise in the exhaust gas pressure cannot be attained.

SUMMARY OF THE INVENTION

One object of the present invention is to provide a turbo compound engine system which is capable of ensuring proper pressure rise in the exhaust bypass line without affecting peripheral members when the engine has to be accelerated after cancellation of the braking force produced by the power turbine against the engine crankshaft.

Another object of the present invention is to provide a turbo compound engine which is capable of realizing such a proper pressure rise, which results in a smooth rise in engine output in response to movement of the governor rack.

In order to achieve the above mentioned purpose, the present invention provides a turbo compound engine characterized by its control means to close the bypass valve for a predetermined period of time on reception of a signal of predetermined nature pertaining to rack movement; wherein the bypass valve is to control the engine operation by controlling the opening of the bypass line; and the signal is to be given when the rack movement associated with mode shifting of the engine operation from turbine brake over to turbine drive has exceeded a predetermined amount.

Another purpose of the present invention is to provide a turbo compound engine equipped with a power turbine and an exhaust gas bypass line, the turbo compound engine being characterized in that the power turbine is so designed as to be able to drive the engine when it is rotating in the normal direction and absorbing the exhaust gas energy ("turbine drive mode") and to apply braking force on the engine when it is reversed in rotation direction ("turbine brake mode");

the exhaust gas bypass line (the "bypass line") is so laid out as to let the exhaust gas flow bypassing the power turbine whenever so desired; and the control of engine operation is done by controlling the opening of the bypass line;

a turbo compound engine that is able to properly raise the pressure of the exhaust bypass through which the exhaust gas is fed to the power turbine (the "exhaust bypass"), by judging the state of accelerating the engine in terms of the rate of movement of the governer's rack (the "movement of the rack"), so as to increase the power output smoothly in accordance with acceleration of the engine, even when such acceleration is attempted immediately after execution of turbine braking, without making the exhaust bypass control for normal low load operation of the engine unduly difficult.

In order to achieve the second purpose described above, the present invention provides a turbo compound engine characterized by its control means to close the bypass valve for a predetermined period of time on reception of a signal of predetermined nature pertaining to rack movement; wherein the bypass valve is to control the engine operation by controlling the opening of the bypass line; and the signal is to be given when the rate of rack movement associated with mode shifting of the engine operation from turbine brake over to turbine drive has exceeded a predetermined rate.

BRIEF DESCRIPTION OF THE DRAWINGS

FIG. 2 is a tabular diagram to show the states of valves;

FIG. 3 is a diagram to show the chronological development of engine power output with regard to control;

FIG. 4 is a system diagram to show an example of the turbo compound engine of this invention;

FIG. 5 is a circuit diagram to show the control logic of the bypass valve;

FIG. 9 is a tabular diagram to show the states of valves according to one possible arrangement method;

FIG. 11 is a tabular diagram to show the states of valves;

FIG. 12 is a diagram to show the chronological development of engine power output with regard to control;

DESCRIPTION OF THE PREFERRED EMBODIMENTS

Now the preferred embodiments of this invention will be disclosed referring to the attached drawings.

First Preferred Embodiment

A first preferred embodiment deals with a turbo compound engine system substantially same as that discussed earlier in "Background Art" section of this specification (see FIGS. 4–7). The only difference here lies in the control of exhaust bypassing, specifically the control of the bypass valve 16, which is to be executed by the control unit 24 for shifting the engine operation mode from the turbine brake domain F (i.e., when the turbine 4 is forced to rotate in the reverse direction) to the turbine drive domain D. The details of this control are programmed in the CPU 28 which will be described later.

Figure 1:
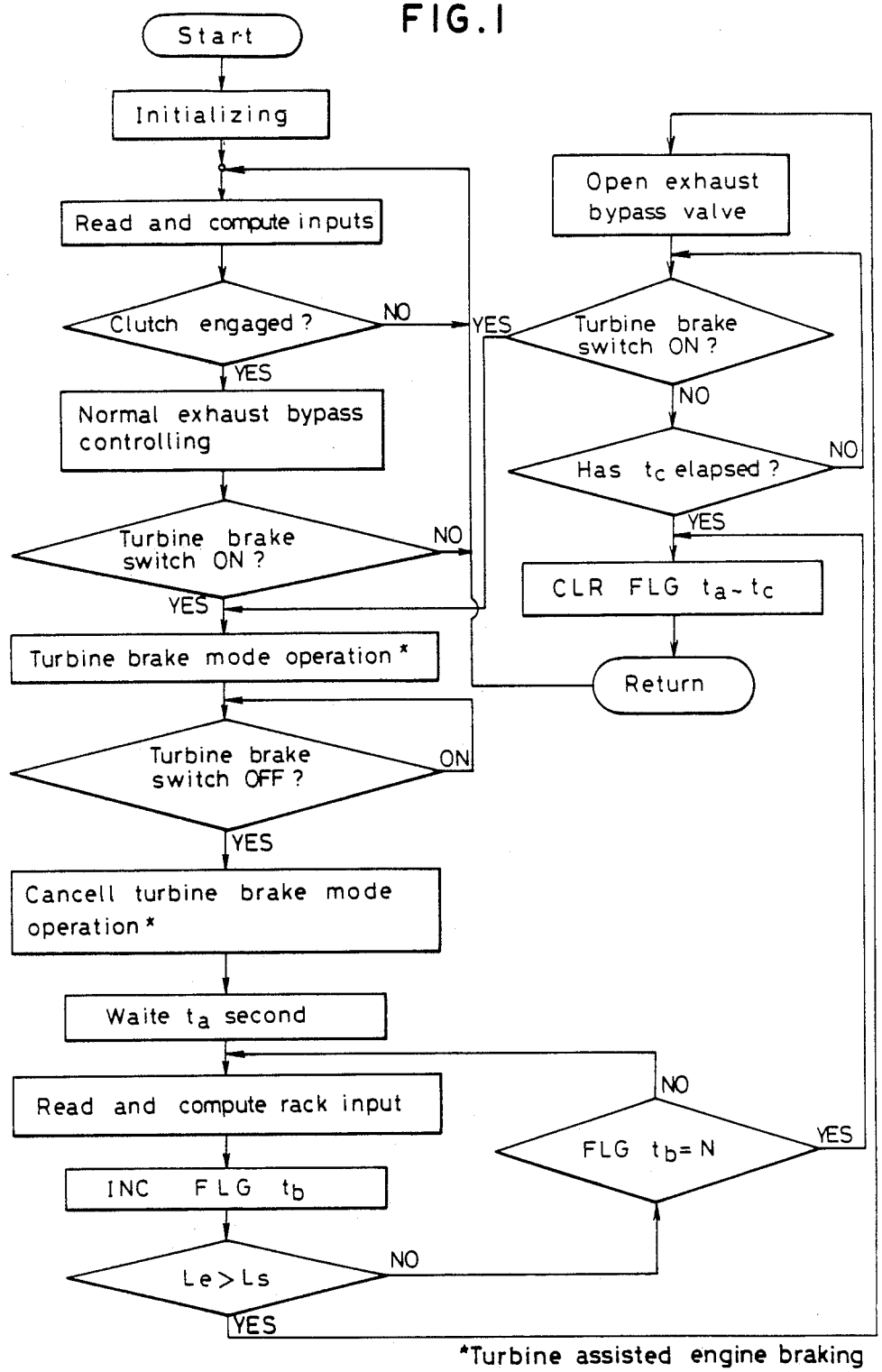
FIG. 1 is a flow chart for use in controlling the turbo compound engine of a preferred embodiment of this invention.
Figure 6:
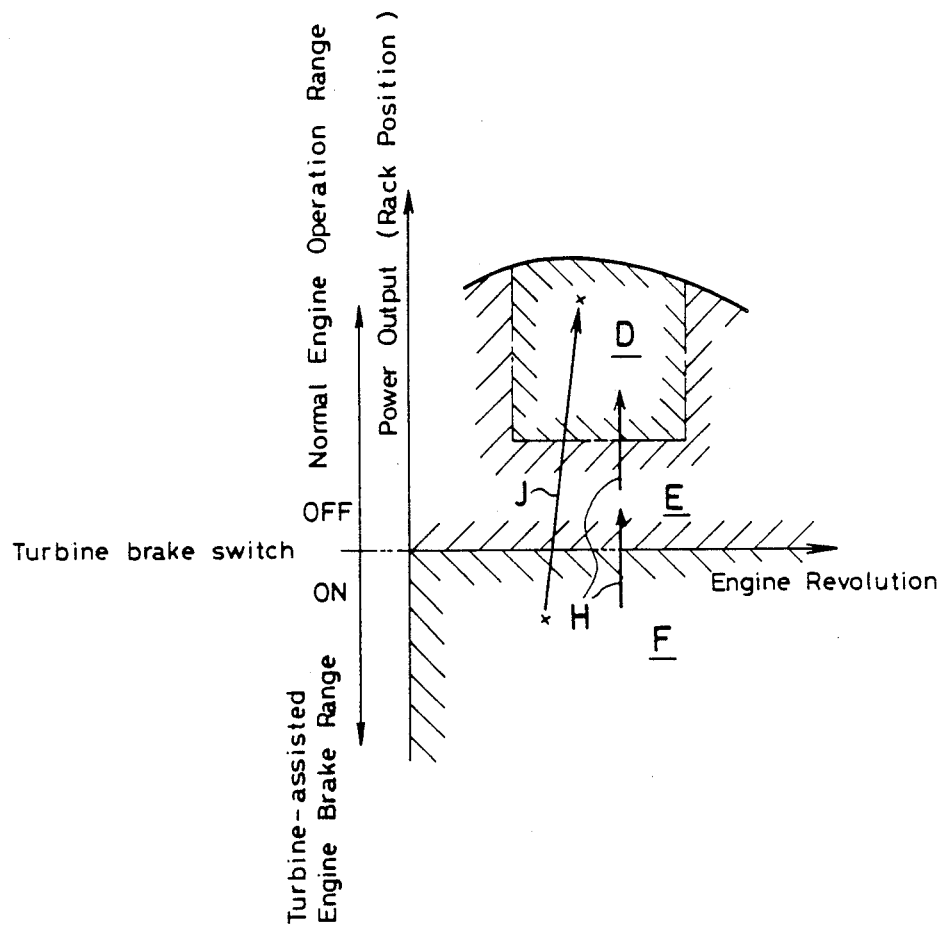
FIG. 6 is a diagram to show the control map for the bypass valve.
Figure 7:
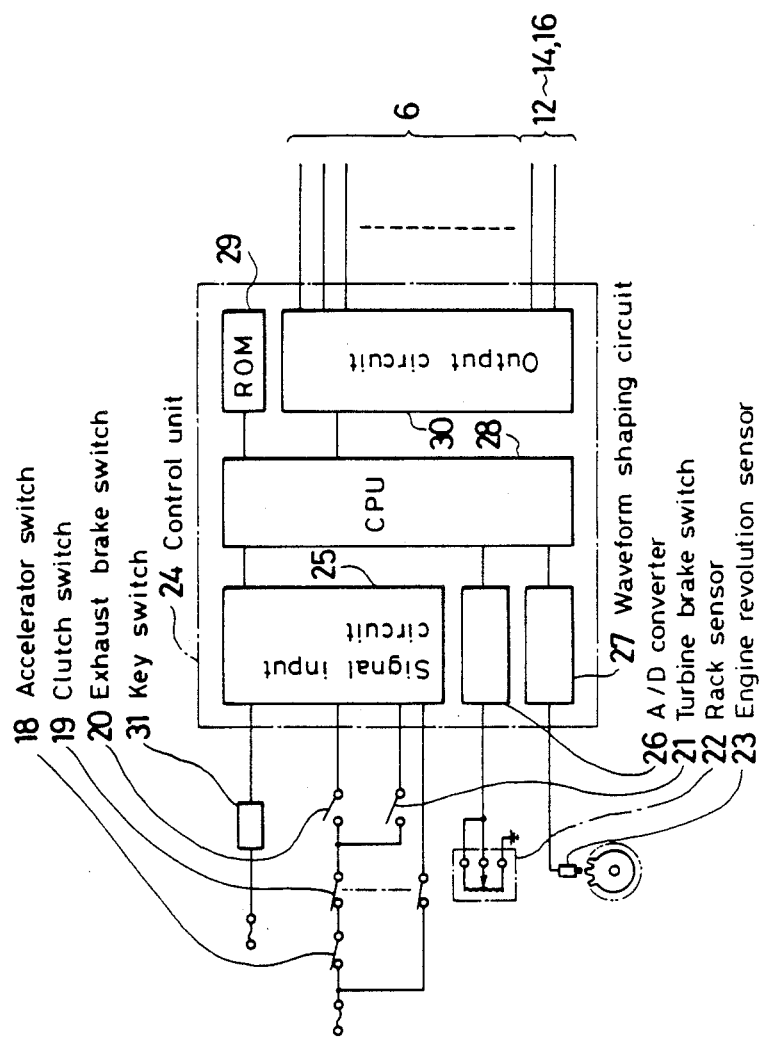
FIG. 7 is a circuit diagram to show the control system of a turbo compound engine.
Figure 8:
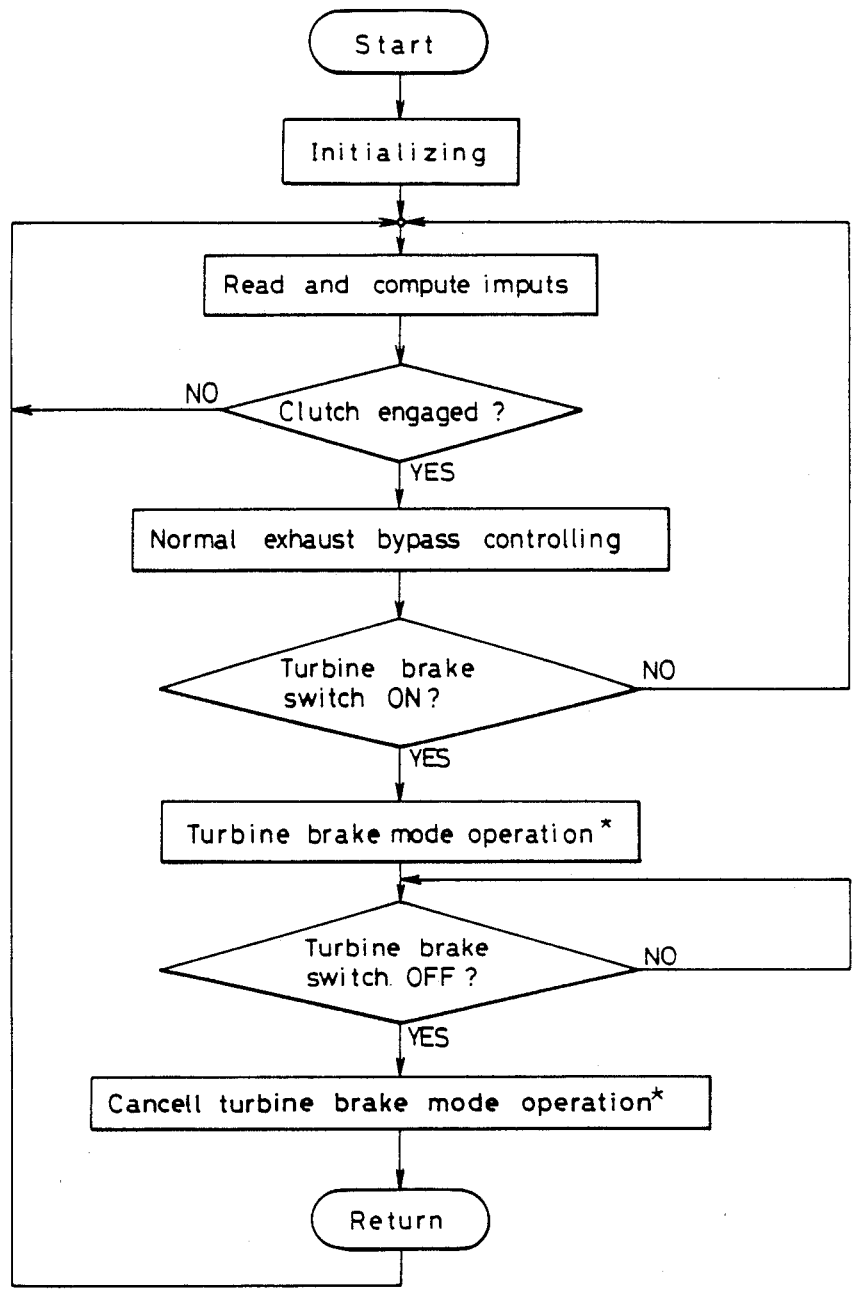
FIG. 8 is a flow chart to show a method of according to one possible arrangement.

Now, the features of this invention are discussed with reference to a flow chart of FIG. 1, as well as FIGS. 2 and 3. Here, the fundamental control flow is much the same as the one described in the Background Art section above. Namely, after the initializing step, the control unit 24 reads in various signals that have been mentioned earlier and processes them.

Firstly, in the normal engine operation domain D, E, the exhaust bypass control is executed on the basis of engine load and engine revolution, once the engagement of clutch has been confirmed by the clutch switch 19.

In this case, the shut-off valve 12 is kept closed and the exhaust brake valve 14 is kept opened, so that when the turbine or rotor 4 is operated in the normal engine drive mode (domain D), the exhaust path 3 is opened (the check valve 13 is open) while the bypass line 15 is closed (the bypass valve 16 is closed) to feed the exhaust to the turbine 4. When the operation is in the exhaust bypass domain E, on the other hand, it is preferable to close the exhaust path 3, even though it may be left open (the check valve 13 is either close or open), while opening the bypass line 15 (the bypass valve 16 is open) so that the exhaust gas will flow bypassing the turbine 4.

As the turbine brake switch 21 is turned on, the turbine 4 is reversed, and the operation is shifted over to the turbine brake domain F. In this case, the control of valves 12 to 14 and 16 is such that both the shut-off valve 12 of the intake air bypass 11 and the bypass valve 16 of the bypass line 15 are opened so as to drive the turbine 4 as a compressor, while the check valve 13 of the exhaust path 3 is closed. Here, the exhaust brake valve 14 is under control of the exhaust brake switch 20. Up to this point, the operation is the same as the conventional one, including cancellation of turbine brake by turning the turbine brake switch 21 off.

According to this invention, on the other hand, the control unit 24 judges the engine 2 to be under considerable acceleration if the amount of rack movement $L_e$ has exceeded a predetermined amount $L_s$ after the turbine brake switch 21 has been turned off, and it moves to execute the control so as to close the bypass valve 16 forcibly while still in the exhaust bypass domain E (FIG. 2).

In more concrete terms, this control is executed as follows:

As soon as the turbine brake switch 21 is turned off, the bypass valve 16 is closed, and, at the same time, the timer in the CPU 28 is started to hold the current status of operation for a predetermined period of time $t_a$ (about 0.5 second). This time period is provided as a waiting time for execution of subsequent engine control to follow up the turning off of the turbine brake switch 21.

As soon as a new action has been taken for engine control, a rack movement $L_e$ is input to the CPU 28 from the rack sensor 22. If this rack movement $L_e$ is in excess of the predetermined amount $L_s$, the control unit 24 judges the engine 2 to be under considerable acceleration, and the bypass valve 16 is kept closed for a predetermined period of time $t_c$, unless the turbine brake switch 21 is turned on again. (FIG. 3).

Here, the time $t_c$ is a duration considered necessary for the turbo compound engine system with an ordinary engine under ordinary engine acceleration to attain the turbine drive mode of operation after the turbine brake switch 21 is turned off. It has to be determined in consideration of such factors as rate of rise of the pressure and temperature of the exhaust gas in the exhaust path 3, and usually 3 to 5 seconds are appropriate.

For this judging of the amount of rack movement, another time $t_b$ (about 0.1 second) is set: if the rack movement $L_e$ does not exceed the predetermined amount $L_s$ in this period of time, i.e., since start of the timer (INC FLG $t_b$) to the time $t_b$ (FLG $t_b=N$), the engine 2 is judged to be not under acceleration or, even if it is, the acceleration is not too acute. In this case, the control mode is shifted back to the usual exhaust bypass control, namely, that of engine control by means of control of the bypass valve 16.

In any event, the control mode is shifted to the usual exhaust bypass control as soon as the predetermined time $t_c$ has elapsed, and the times $t_a$, $t_b$, and $t_c$ are all cleared (CLR FLG $t_a$, $t_b$, $t_c$).

One salient favorable effect of the control of the first embodiment, i.e., that of forcibly suppressing the exhaust bypass control while the engine operation mode is shifted from turbine brake over to turbine drive, is to solve the problem of insufficient power output response due to the lagging rise of the rotation velocity of turbine 4, which is caused by the lagging pressure rise in the exhaust path 3 since the bypass valve 16 is kept opened in the conventional arrangement and control. The result of such a favorable control is to secure a proper pressure rise, such as illustrated in FIG. 3 with a solid line, and to ensure smooth power output development.

Second Preferred Embodiment

In the second preferred embodiment, the same engine system structure as discussed earlier in the "Background Art" section is used (see FIGS. 4–7). One difference here will be seen in the control of exhaust bypassing, especially the control of the bypass valve 16, which is executed by the control unit 24 when the engine operation mode is shifted from the turbine brake domain F (i.e., when the turbine 4 is forced to rotate in the reverse direction) over to the turbine drive domain D. The details of this control are programmed in the CPU 28.

Figure 10:
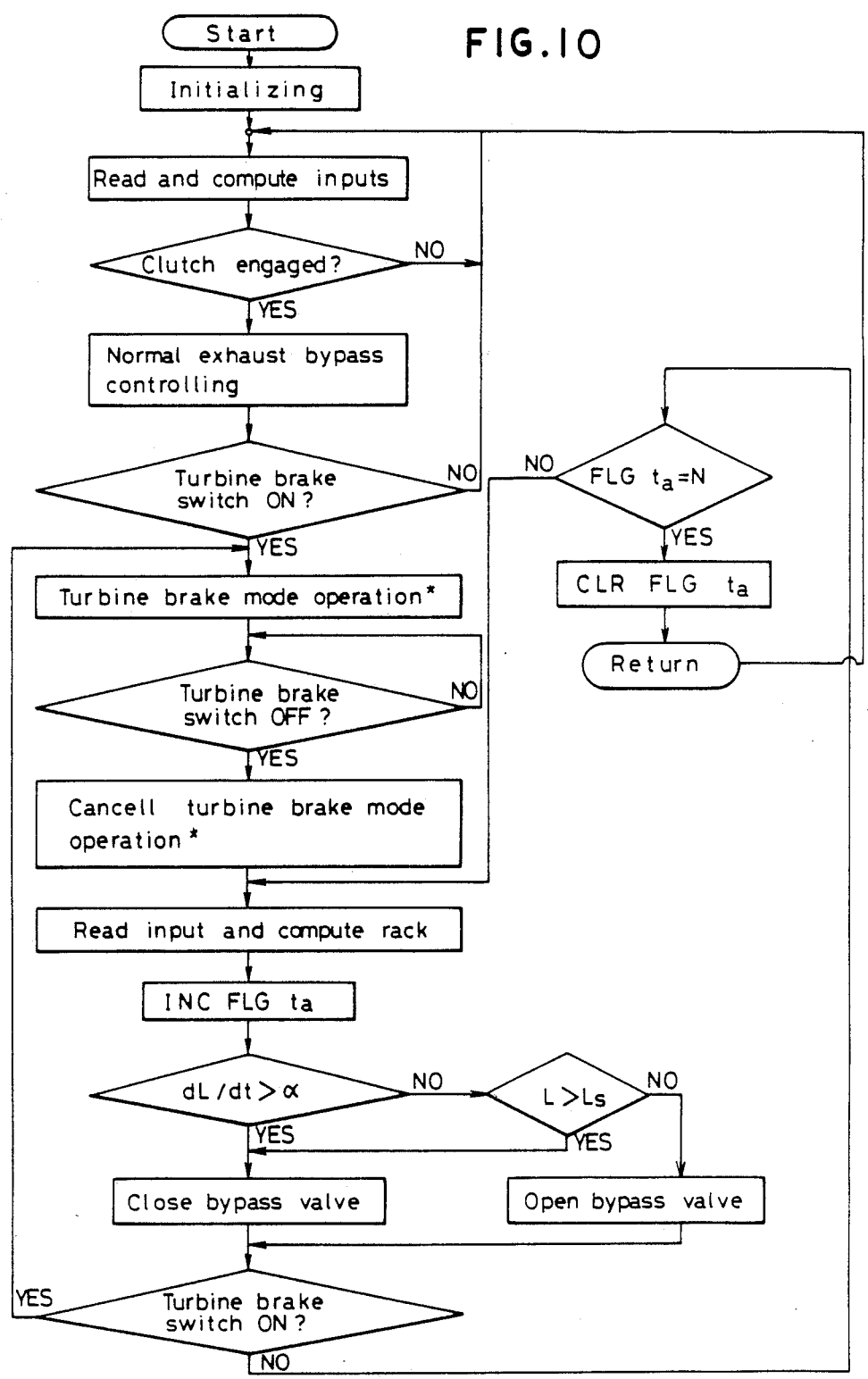
FIG. 10 is a flow chart to be used in controlling a turbo compound engine of the first preferred embodiment of this invention.

Now, the features of this invention are discussed following the above mentioned control flow, referring to FIGS. 10 to 12. Here, the fundamental control flow is much the same as the conventional one. Namely, in the initialized state of engine operation, i.e., when the control unit 24 has been prepared with predetermined initial values, the control unit 24 reads in these signals that have been mentioned earlier and processes them.

First, in the normal engine operation domain D, E, the exhaust bypass control is executed on the basis of engine load and engine revolution speed, once engagement of clutch has been confirmed by the clutch switch 19.

In this case, the shut-off valve 12 is kept closed and the exhaust brake valve 14 is kept opened, so that when the turbine 4 is in the normal engine drive mode (domain D), the exhaust path 3 is opened (the check valve 13 is open) while the bypass line 15 is closed (the bypass valve 16 is close) to feed the exhuast to the turbine 4.

When the operation is in the exhaust bypass mode (domain E), on the other hand, it is preferable to close the exhaust path 3, even though it may be left open (the check valve 13 is either closed or open), while opening the bypass line 15 (the bypass valve 16 is open), so that the exhaust gas will flow bypassing the turbine 4.

Next, as the turbine brake switch 21 is turned on, the turbine 4 is reversed, and the operation is shifted over to the turbine brake mode (domain F). In this case, the control of valves 12 to 14 and 16 is such that both the shut-off valve 12 of the shut-off bypass 11 and the bypass valve 16 of the bypass line 15 are opened so as to drive the turbine 4 as a compressor, while the check valve 13 of the exhaust path 3 is closed. Here, the exhaust brake valve 14 is operated independently of other valves, i.e., it depends on manipulation of the exhaust brake switch 20.

Up to this point, the operation is the same as the conventional one, including cancelling of turbine brake by turning off the turbine brake switch 21.

According to this embodiment, on the other hand, the control unit 24 judges the engine 2 to be under considerable acceleration if the rate of rack movement dL/dt (L being the amount of rack movement) has exceeded a predetermined rate $\alpha$ after the turbine brake switch 21 has been turned off, and it moves to execute the control so as to close the bypass valve 16 forcibly while still in the exhaust bypass domain E (FIG. 11).

Figure 13:
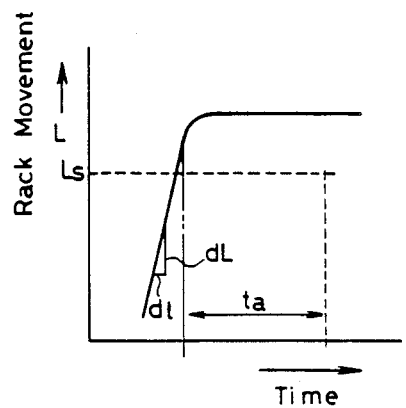
FIG. 13 is a diagram to explain the way to determine the rate of the rack movement.

In more concrete terms, this control is executed as follows:

As soon as the turbine brake switch 21 is turned off, the timer in the CPU 28 is started (INC FLG $t_a$), and, at the same time, an amount of rack movement L is input to CPU 28 from the rack sensor 22 when a new action has been taken for the engine control to calculate out the instantaneous rate of rack movement dL/dt. Here, the computation is conducted every short period of time dt (about 0.1 second) for the amount of rack movement dL detected in that period of time, as shown in FIG. 13.

If this rack movement rate dL/dt is judged to be greater than the predetermined rate $\alpha$, the bypass valve 16 is kept closed forcibly for a predetermined period of time $t_a$ (FLG $t_a=N$), unless the turbine brake switch 21 is turned on in that period of time.

Here, the time $t_a$ is a duration considered necessary for the turbo compound engine system with an ordinary engine and an ordinary manner of engine acceleration to attain the turbine driving mode of operation after the turbine brake switch 21 has been turned off. It is to be determined in consideration of such factors as rate of rise of the pressure and temperature of the exhaust gas in the exhaust path 3, and usually 3 to 5 seconds are appropriate.

In the present preferred embodiment, moreover, the amount of rack movement L determined above is examined as to whether it has exceeded a predetermined amount $L_s$ or not. That is to say, if the amount of rack movement L has exceeded the predetermined amount $L_s$, the engine 2 is judged to be under considerable acceleration even if the rate of rack movement dL/dt is lower than the predetermined rate $\alpha$, whereby the bypass valve 16 is closed.

If both the rate of rack movement dL/dt and the amount of rack movement L are smaller than the respectively predetermined values $\alpha$ and $L_s$, on the other hand, the control mode is shifted back to the usual exhaust bypass control, namely, that of engine control by controlling the bypass valve 16.

Figure 14:
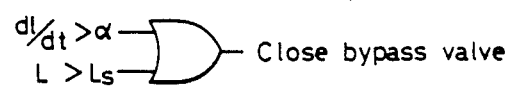
FIG. 14 is a circuit diagram to show the control logic for the bypass valve.

This control logic is shown in FIG. 14: if $dL/dt > \alpha$ or $L > L_s$, then the bypass valve 16 is forcibly closed.

Finally, the time $t_a$ is duly and automatically cleared (CLR FLG $t_a$).

One salient favorable effect of the control of the second embodiment, i.e., that of forcibly suppressing the exhaust bypass control when the engine operation mode is shifted from turbine brake over to turbine drive, is to solve the problem of insufficient power output response due to the lagging rise of the rotation velocity of turbine 4, which is caused by the lagging pressure rise in the exhaust path 3 that takes place when the bypass valve 16 is opened, an action which is necessarily involved in the aforesaid operation mode changeover in the system described in the Background Art section above. The result of such a favorable control is, like the foregoing embodiment, to secure a proper pressure rise, such as illustrated in FIG. 12 with a solid line, and to ensure a smooth power output development.

Third Preferred Embodiment

Figure 15:
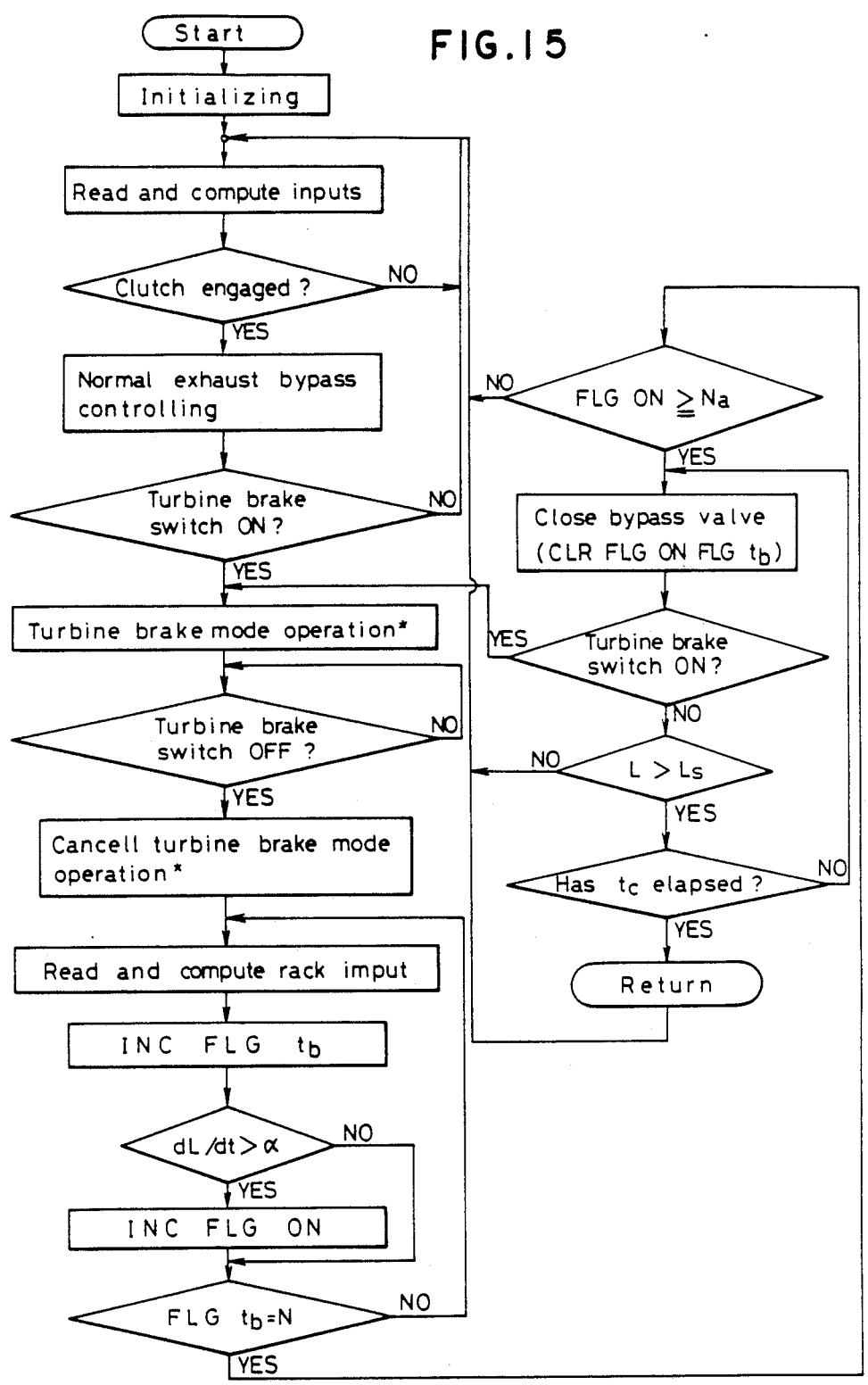
FIG. 15 is a flow chart to be used in controlling a turbo compound engine of the second preferred embodiment of this invention.
Figure 16:
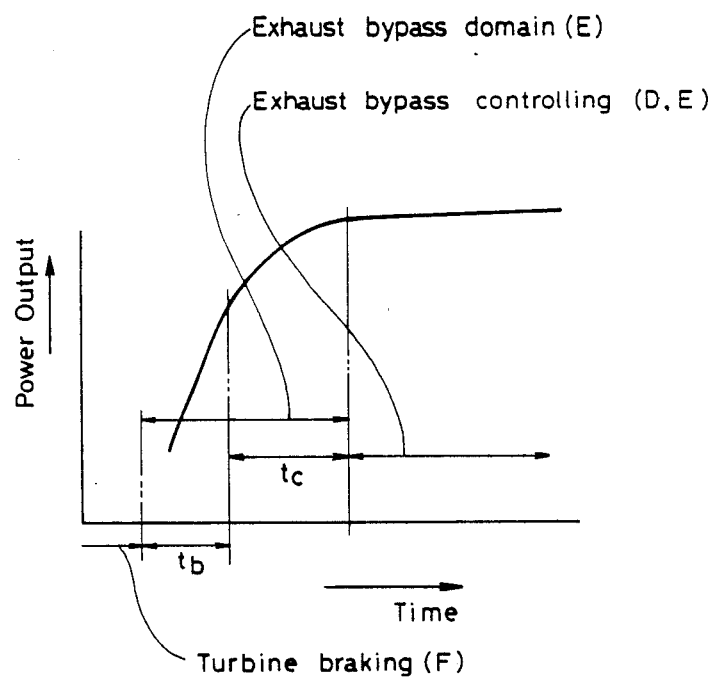
FIG. 16 is a diagram to show the chronological development of engine power output with regard to control.

FIGS. 15 and 16 show the control flow and its characteristics of the third preferred embodiment.

It will be seen that in this embodiment, as soon as the turbine brake switch 21 is turned off, the timer of the CPU 28 is started (INC FLG $t_b$) while the bypass valve 16 is closed at the same time. This state of affairs is maintained for a predetermined period of time $t_b$, during which time the number of times the rate of rack movement dL/dt has exceeded a predetermined rate $\alpha$ is counted up (INC FLG ON).

If the number so determined has been found to have reached or exceeded a predetermined number $N_a$ (FLG $ON \geq N_a$) at the end of $t_b$, the engine 2 is judged to be under acceleration, and the bypass valve 16 is kept closed forcibly for a predetermined period of time $t_c$, unless the turbine brake switch 21 is turned on again or the amount of rack movement L has become smaller than the predetermined amount $L_s$. The manner to determine $t_c$ is same as described in the first embodiment.

Needless to say, the third preferred embodiment disclosed above is able to develop the same effects as the foregoing two embodiments.

Finally, one feature common to these preferred embodiments described above, as well as to any applications thereof, is to construct the power turbine of this invention's turbo compound engines, i.e., the turbine 4 in the foregoing disclosures, in such a way that its impeller is enclosed rotation-free in an involute-based casing, and provision is so made that one of the shafts of the impeller, either the power input shaft or the power output shaft as the case may be, is connected to the power output shaft of the engine 2 directly or indirectly.

We claim:

1. A turbo compound engine adapted for use with a vehicle and controlled by an operator, comprising:
   an engine having an output shaft, an intake air passage and an exhaust gas passage;
   a governor and a control rack therefor;
   a rotor disposed in the exhaust gas passage and rotatable in first and second directions, the first direction being the direction the engine output shaft rotates and the second direction being the direction opposite said first direction, the rotor being rotatable in a manner such that the rotor applies energy to the engine when it is rotated in said first direction by the exhaust gas from the engine whereas the rotor applies a brake force against the engine when it is rotated in said second direction by the intake air;
   an intermediate member for connecting the rotor with the engine output shaft;
   a first bypass line coupled with the intake air passage and joined with the exhaust gas passage downstream of the rotor for allowing the intake air to bypass the engine and reach the rotor;
   a second bypass line coupled with the exhaust gas passage upstream of the rotor for allowing exhaust gas from the engine to bypass the rotor when the rotor changes its direction of rotation from the second to the first direction of rotation and for allowing the intake air introduced through the first bypass line to flow therethrough when the rotor is rotating in the second direction of rotation thereof;
   a selector switch operated by the vehicle operator for selecting between the first and second directions of rotations of the rotor;
   reversing means for changing the rotation direction of the rotor when the operator operates the selector switch; and
   control means for closing the second bypass line for a predetermined period of time when the selector switch is operated to select the first direction of rotation of the rotor and the amount of movement of the control rack of the governor has exceeded a predetermined amount.

2. A turbo compound engine according to claim 1, wherein the second bypass line includes a valve activated by the control means so as to fully close the second bypass line for a predetermined period of time if the amount of movement of the control rack has exceeded a predetermined amount.

3. A turbo compound engine according to claim 2, wherein the control means includes:
   a bypass valve coupled with the second bypass line;
   a rack sensor for detecting the amount of the rack movement and for producing a signal related to the detected amount of rack movement; and
   a control unit for activating the bypass valve to close the second bypass line for a predetermined period of time if the signal produced by the rack sensor after the selector switch has been operated to select the rotor-assisted engine drive mode has exceeded a predetermined value stored in the control unit.

4. A turbo compound engine according to claim 3, wherein the predetermined amount set for the control rack is an amount of movement of the control rack that represents the state of acceleration of the engine; and the predetermined period of time is that required by the rotor to attain sufficient working order in view of the rate of rise of pressure or temperature of the exhaust gas.

5. A turbo compound engine according to claim 1, wherein the control means includes:
   a bypass valve for opening and closing the second bypass line;

a rack sensor for detecting the amount of the rack movement and for producing a signal related to the detected amount of rack movement; and a control unit for activating the bypass valve to close the second bypass line for a predetermined period of time if the signal produced by the rack sensor after the selector switch has been operated to select the first direction of rotor rotation has exceeded a predetermined value stored in the control unit.

6. A turbo compound engine according to claim 1, wherein the predetermined amount of the control rack is an amount of movement of the control rack that represents the state of acceleration of the engine; and the predetermined period of time is that required by the rotor to attain sufficient operating speed in view of the rate of rise of pressure or temperature of the exhaust gas.

7. A turbo compound engine according to claim 1, wherein the rotor comprises an impeller having a power input shaft and an involute-shaped casing, the impeller being rotatably mounted in the casing; and the power input shaft of the impeller is connected to the engine output shaft via the intermediate member.

8. A turbo compound engine adapted for use with a vehicle and controlled by an operator, comprising:

an engine having an output shaft, an intake air passage and an exhaust gas passage;

a governor and a control rack therefor;

a rotor disposed in the exhaust gas passage and rotatable in first and second directions, the first direction being the direction the engine output shaft rotates and corresponding to a rotor-assisted engine driving mode, the second direction being opposite said first direction and corresponding to a rotor-assisted engine brake mode, whereby the rotor applies energy to the engine in the rotor-assisted engine drive mode when it rotates in said first direction whereas the rotor applies a brake force against the engine in the rotor-assisted engine brake mode when it rotates in said second direction;

an intermediate member for connecting the rotor with the engine output shaft;

a first bypass line coupled with the intake air passage and joined with the exhaust gas passage downstream of the rotor;

a second bypass line coupled with the exhaust gas passage upstream of the rotor for allowing exhaust gas from the engine to bypass the rotor;

a selector switch operable by the vehicle operator for selecting either of the rotor-assisted engine drive mode or the rotor-assisted engine brake mode;

reversing means for changing the rotational direction of the rotor when the operator operates the selector switch and control means for closing the second bypass line for a predetermined period of time when the selector switch is operated to switch to the rotor-assisted engine drive mode from the rotor-assisted engine brake mode and the rate of movement of the control rack of the governor has exceeded a predetermined rate and for allowing the intake air to flow into the first bypass line and then into the second bypass line when the selector switch is operated to select the rotor-assisted engine brake mode.

9. A turbo compound engine according to claim 8, wherein the second bypass line includes a valve activated by the control means so as to fully close the second bypass line for a predetermined period of time if the rate of movement of the control rack has exceeded a predetermined rate.

10. A turbo compound engine according to claim 9, wherein the control means includes:

a bypass valve for opening and closing the bypass line;

a rack sensor for detecting the rate of the rack movement and for producing a signal related to the detected rate of rack movement; and a control unit for activating the bypass valve to close the bypass line for a predetermined period of time if the signal produced by the rack sensor after the selector switch has been switched to select the rotor-assisted engine drive mode has exceeded a predetermined value stored in the control unit.

11. A turbo compound engine according to claim 10, wherein the predetermined amount set for the control rack is a rate of movement of the control rack that represents the state of acceleration of the engine; and the predetermined period of time is that which the rotator requires to reverse its rotation direction in view of the rate of rise of pressure or temperature of the exhaust gas.

12. A turbo compound engine according to claim 8, wherein the control means includes:

a bypass valve for opening and closing the second bypass line;

a rack sensor for detecting the rate of the rack movement and for producing a signal related to the detected rate of rack movement; and a control unit for activating the bypass valve to close the second bypass line for a predetermined period of time if the signal produced by the rack sensor after the selector switch has been operated to select the rotor-assisted engine drive mode has exceeded a predetermined value stored by the control unit.

13. A turbo compound engine according to claim 8, wherein the predetermined amount of the control rack is a rate of movement of the control rack that represents the state of acceleration of the engine; and the predetermined period of time is that which the rotor requires to reverse is rotational direction in view of the rate of rise of pressure or temperature of the exhaust gas.

14. A turbo compound engine according to claim 8, wherein the rotor comprises an impeller having a power input shaft and an involute-shaped casing, the impeller being rotatably mounted in the casing; and the power input shaft of the impeller is connected to the engine output shaft.

15. A turbo compound engine adapted for use with a vehicle operated by an operator, comprising:

an engine having an output shaft and an exhaust gas passage;

a governor and a control rack therefor;

a rotor disposed in the exhaust gas passage and rotatable in first and second directions, the first direction being the direction the engine output shaft rotates and the second direction being the direction opposite said first direction, in a manner such that the rotor applies energy to the engine to define a rotor-assisted engine drive mode when it rotates in said first direction whereas the rotor applies a brake force against the engine to define a rotor-assisted engine brake mode when it rotates in said second direction;

an intermediate member for connecting the rotor with the engine output shaft;

a bypass line coupled with the exhaust gas passage upstream of the rotor for allowing exhaust gas from the engine to bypass the rotor;

a selector switch operable by the vehicle operator for selecting the rotor-assisted engine drive mode or the rotor-assisted engine brake mode;

reversing means for changing the rotation direction of the rotor when the operator operates the selector switch; and control means for closing the bypass line for a predetermined period of time when the selector switch is operated to change the rotor-assisted engine drive mode from the rotor-assisted engine brake mode and the amount of movement of the control rack of the governor has exceeded a predetermined amount.

16. A turbo compound engine according to claim 15, wherein the control means includes:

a bypass valve for opening and closing the bypass line;

a rack sensor for detecting the amount of the rack movement and for producing a signal related to the detected amount of rack movement; and a control unit for activating the bypass valve to close the bypass line for a predetermined period of time if the signal produced by the rack sensor after the selector switch has been switched to select the rotor-assisted engine drive mode has exceeded a predetermined value stored by the control unit.

17. A turbo compound engine according to claim 16, wherein the predetermined amount of movement for the control rack corresponding to the stored value is an amount of movement of the control rack that represents the state of acceleration of the engine; and the predetermined period of time is that which the rotor requires to attain sufficient operating speed in view of the rate of rise of pressure or temperature of the exhaust gas.

18. A turbo compound engine for use with a vehicle and switchable between an engine braking mode and a boosted engine drive mode, wherein said engine includes an output shaft, an intake air passage an an exhaust gas passage, comprising:

a governor and a control rack therefor;

a rotor disposed in the exhaust gas passage, the rotor being rotatable by the exhaust gas in a first direction corresponding to the direction of rotation of the engine output shaft so as to supply energy to the engine in the energy driving mode and being rotatable by the intake air in a second direction opposite said first direction so as to apply a brake force on the engine in the engine braking mode;

means for coupling the rotor with the engine output shaft;

a first bypass line coupled between the intake air passage and exhaust gas passage downstream of the rotor for allowing intake air to bypass the engine and be delivered to the rotor;

a second bypass line coupled with the exhaust gas passage upstream of the rotor for allowing exhaust gas from the engine to bypass the rotor in the engine driving mode and for allowing the intake air introduced into said first bypass line to flow therethrough during said engine braking mode;

actuatable selection means for selecting either of said engine braking or engine driving modes;

reversing means responsive to said selection means for changing the direction of rotation of the rotor; and control means for closing the second bypass line for a predetermined period of time when the selection means is actuated to select the engine driving mode and the amount of movement of the control rack has exceeded a predetermined amount.

19. A turbo compound engine according to claim 18, wherein the second bypass line is equipped with a valve that is activated by the control means so as to fully close the second bypass line for a predetermined period of time if the amount of movement of the control rack has exceeded a predetermined amount.

20. A turbo compound engine according to claim 18, wherein the control means includes:

a bypass valve for opening and closing the second bypass line;

a rack sensor for detecting the amount of the rack movement and for producing a signal related to the detected amount of the rack movement; and a control unit for activating the bypass valve to close the second bypass line for a predetermined period of time if the signal produced by the rack sensor after the selection means has been actuated to select the engine driving mode has exceeded a predetermined value memorized by the control unit.

21. A turbo compound engine according to claim 18, wherein:

the predetermined amount set for the control rack is an amount of movement of the control rack that represents the state of acceleration of the engine; and the predetermined period of time is that required by the rotor to attain sufficient working order in view of the rate of rise of pressure or temperature of the air or exhaust gas.

22. A turbo compound engine according to claim 18, wherein:

the rotor includes an impeller having a power input shaft and an involute-shaped casing, the impeller being rotatably mounted in the casing, and, the coupling means includes an intermediate member for connecting the power input shaft of the impeller to the engine output shaft.

* * * * *